No. 824,063. PATENTED JUNE 19, 1906.
L. BURG.
COUPLING FOR DOUBLETREES AND SWINGLETREES.
APPLICATION FILED NOV. 7, 1905.

2 SHEETS—SHEET 1.

Fig. 2ª.

Witnesses

Inventor
Louis Burg.
James J. Shulz
By
Attorney

No. 824,063. PATENTED JUNE 19, 1906.
L. BURG.
COUPLING FOR DOUBLETREES AND SWINGLETREES.
APPLICATION FILED NOV. 7, 1905.
2 SHEETS—SHEET 2.
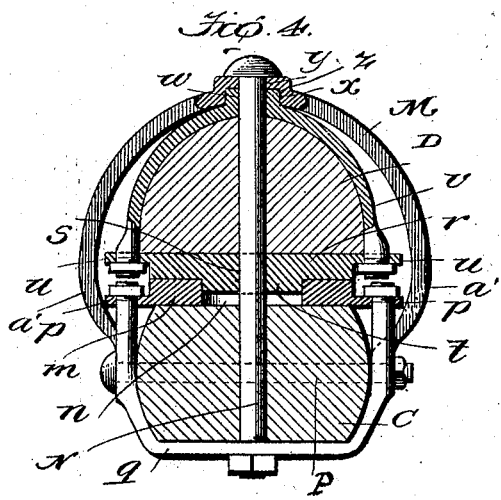
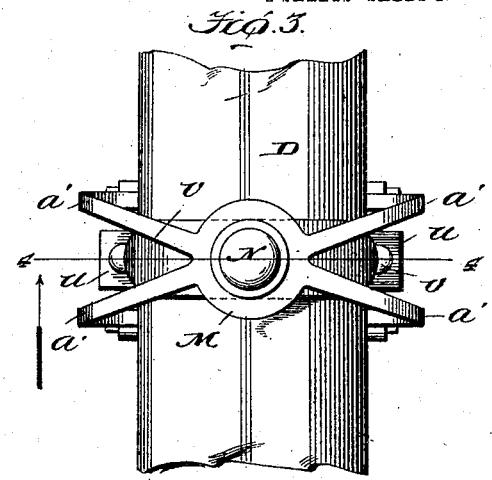
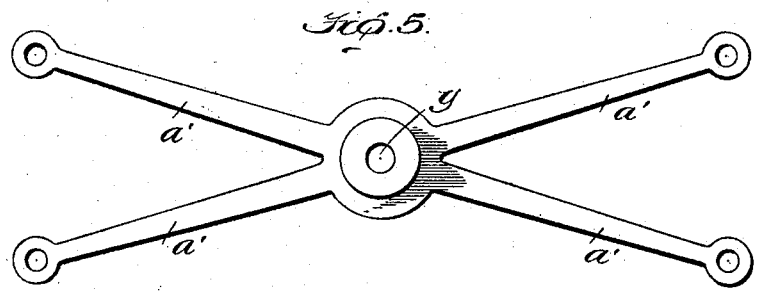
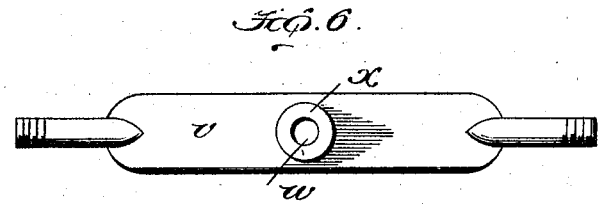
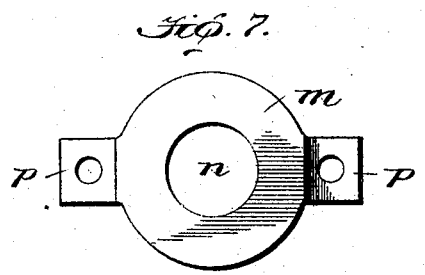
Witnesses
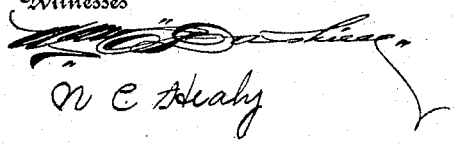
N C Healy
Inventor
Louis Burg
By James J Sheehy
Attorney

UNITED STATES PATENT OFFICE.

LOUIS BURG, OF DALLAS CITY, ILLINOIS.

COUPLING FOR DOUBLETREES AND SWINGLETREES.

No. 824,063.  Specification of Letters Patent.  Patented June 19, 1906.

Application filed November 7, 1905. Serial No. 286,198.

*To all whom it may concern:*

Be it known that I, LOUIS BURG, a citizen of the United States, residing at Dallas City, in the county of Henderson and State of Illinois, have invented new and useful Improvements in Couplings for Doubletrees and Swingletrees, of which the following is a specification.

My invention pertains to doubletrees and swingletrees, and more particularly to the manner of mounting the same; and it contemplates coupling a doubletree and swingletrees to their supports in such manner that liability of the trees splitting is reduced to a minimum, and at the same time the trees are prevented from tilting forwardly and are also prevented from pulling away from their supports even when their pivot-bolts are broken or displaced.

Other advantageous features peculiar to my invention will be fully understood from the following description and claims when taken in connection with the accompanying drawings, forming part of this specification, in which—

Figure 1:
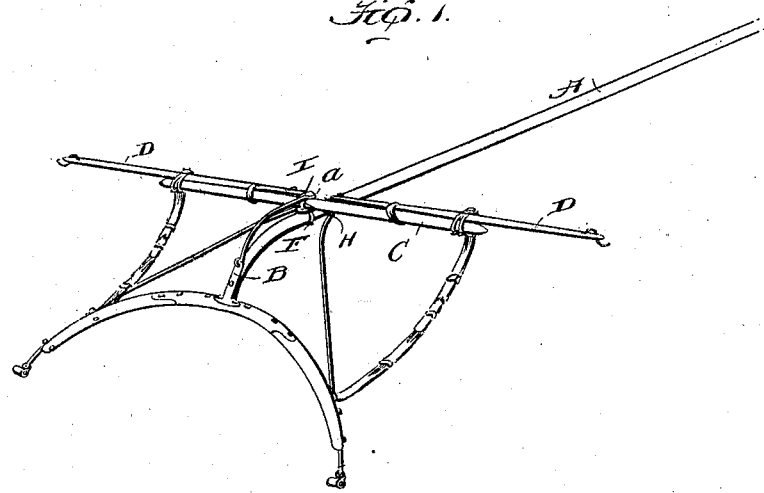
Figure 2:
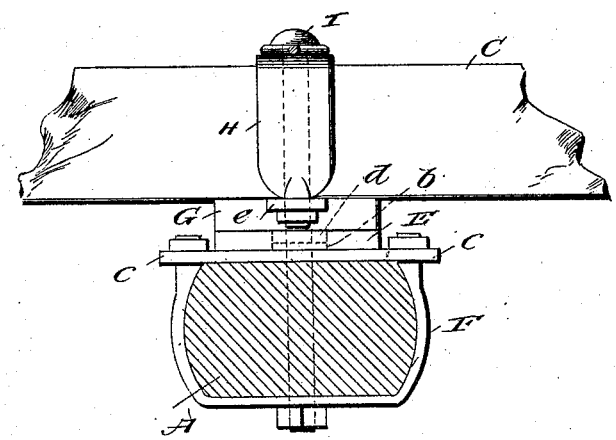
Figure 2:
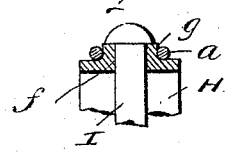

Figure 1 is a perspective view of a carriage or wagon pole equipped with a doubletree and swingletrees coupled in accordance with my invention. Fig. 2 is an enlarged detail view, partly in elevation and partly in section, illustrating the coupling between the doubletree and the pole. Fig. 2ª is a detail diametrical section illustrating the connection of the eye of the hammer-strap to the yoke straddling the doubletree. Fig. 3 is an enlarged detail top plan view of one of the couplings effecting connection of the swingletrees to the doubletree. Fig. 4 is a transverse section of the same, taken in the plane indicated by the line 4 4 of Fig. 3. Fig. 5 is a top plan view of the major yoke, which I prefer to employ in each of the swingletree-couplings, as such yoke appears precedent to being bent into U shape. Fig. 6 is a similar view of one of the minor yokes of the swingletree-couplings, and Fig. 7 is a top plan view of the lower wear-plate of the swingletree-coupling.

Similar letters designate corresponding parts in all of the views of the drawings, referring to which—

A is a carriage or wagon pole.

B is a metallic hammer-strap connected to the rear portion of the pole and reaching forwardly from its point of connection and terminating in an eye $a$.

C is a doubletree arranged above and disposed at right angles to the pole, and D D are swingletrees carried by the doubletree.

The pole, the doubletree, and the swingletrees are of wood and, generally speaking, are constructed in the ordinary well-known manner.

E, Fig. 2, is a wear-plate disposed on the upper side of the pole A and having a central aperture $b$ and also having apertured lugs $c$. F is a yoke straddling the pole A and having the ends of its legs secured by nuts or otherwise in the apertured lugs of the said wear-plate E.

G is a wear-plate superposed on the wear-plate E and having a central aperture and a circular depending flange $d$, surrounding said aperture and journaled in the aperture $b$ of the wear-plate E and also having apertured lugs $e$.

H is a yoke disposed at right angles to the yoke F and straddling the doubletree C and having its ends secured in the lugs $e$ of the wear-plate G, and also having a central aperture $f$ and a raised flange $g$, surrounding the same, and I is a pivot-bolt extending through the eye $a$ of the hammer-strap B, which eye $a$ surrounds the raised flange $g$ of the yoke H and also extends through the said yoke H, the doubletree C, the wear-plate G, the opposed wear-plate E, the pole A, and the yoke F in the order named and secured below the latter yoke by a nut, as shown, or other means suitable to the purpose.

The parts just described constitute the coupling for effecting connection of the doubletree to the pole, and it will be apparent that the said coupling permits free horizontal movement of the doubletree on the pole without frictional wear of either and yet precludes forward tilting of the doubletree in use, which is an important desideratum. The hammer-strap B engaging the upper yoke H in the manner described, and best shown in Figs. 1 and 2ª, obviously contributes materially in preventing forward tilting of the doubletree and taking strain off the pivot-bolt I. It will also be apparent that the arrangement of the flange $d$ of the upper wear-plate G in the aperture $b$ of the lower wear-plate E assists in taking strain off the pivot-bolt, and it will further be apparent that the connection of the lower wear-plate E and the upper wear-plate G to the pole A and doubletree C, respectively, does not entail the employment of wood-screws or the like penetrating the pole and the doubletree, which screws are very objectionable, inasmuch as they tend to weaken the pole and the doubletree and are liable to work loose as well as cause the pole and doubletree to split after a short period of use.

The couplings for connecting the swingletrees D to the doubletree C are identical in construction, and for this reason a detailed description of the single coupling shown in Figs. 3 to 7 of the drawings will suffice to impart a definite understanding of both swingle tree-couplings. The said coupling, Figs. 3 to 7, comprises a lower wear-plate $m$, disposed on the doubletree and having a central aperture $n$ and also having apertured lugs $p$; a yoke $q$ straddling the doubletree and having its ends secured by nuts or other means in the lugs of the plate $m$; an upper wear-plate $r$, arranged on the plate $m$ and below the swingletree D and having a central aperture $s$ and a depending flange $t$, surrounding said aperture and journaled in the aperture $n$ of the plate $m$, and also having apertured lugs $u$; a yoke $v$ straddling the swingletree and having its ends secured in the lugs $u$ of the upper wear-plate, and also having a central aperture $w$ and a raised flange $x$ surrounding the same; a major yoke M having a central aperture $y$ and a socket $z$ in its under side receiving the raised flange $x$ of the yoke $v$, and also having divergent legs $a'$; a headed pivot-bolt N extending through the major yoke M, the minor yoke $v$, the swingletree D, the upper wear-plate $r$, the lower wear-plate $m$, the double tree C and the minor yoke $q$ in the order named and secured below the latter yoke by a nut or other suitable means, and transverse bolts P extending through the legs of the major yoke M and the doubletree C and fixedly connecting the former to the latter. I prefer to provide the major yoke M with diverging legs, (best shown in Figs. 3 and 5,) because said yoke is then fixedly connected to the doubletree C at opposite sides of the vertical plane of the pivot-bolt, which obviously contributes materially to the strength and durability of the coupling. I do not desire, however, to be understood as confining myself to making the major yoke with divergent legs, as the said yoke may be made with but two legs, one at either side of the swingletree, without involving a departure from the scope of my invention.

It will be gathered from the foregoing that the couplings connecting the swingletrees and the doubletree do not entail the use of wood-screws or other means calculated to weaken the doubletree and swingletrees or split the same. On the other hand, it will be apparent that the wear-plates of the coupling preclude frictional wear of the doubletree and swingletrees and in connection with the minor yokes materially reinforce and strengthen the doubletree and swingletrees, so that while the swingletrees are free to turn or swing horizontally on the doubletree there is no liability of the doubletree or swingletrees splitting in practice. Moreover, it will be observed that the pivot-bolt N is prevented from wearing large holes in the doubletree and swingletree, and forward tilting of the swingletree on the doubletree, as well as casual disconnection of the former from the latter, is precluded. This latter is due to the major yoke M, for it will be seen that even if the pivot-bolt is broken or displaced the yoke M will effectually prevent forward tilting of the swingletree or pulling of the same away from the doubletree.

In addition to the practical advantages which I have hereinbefore ascribed to my improvements the same are simple and inexpensive and do not add materially to the cost of a carriage or wagon pole and its appurtenances or render the same cumbersome and unsightly in appearance.

While I have shown and described the swingletrees as coupled to a doubletree, I desire it distinctly understood that my novel coupling may be used to advantage in connecting a swingletree to any suitable support other than a doubletree.

Having described my invention, what I claim, and desire to secure by Letters Patent, is—

1. The combination of a support, a swinging tree, a pivot-bolt extending vertically through and connecting the support and the tree opposed wear-plates interposed between the support and the tree and having central apertures receiving the pivot-bolt and apertured lugs extending beyond the support and the tree, respectively; one of said wear-plates also having a central portion journaled in the other wear-plate, a yoke straddling the support and having integral arms which terminate in threaded portions extending through the apertured lugs of the adjacent wear-plate, nuts mounted on said threaded portions, a yoke straddling the tree and having integral arms which terminate in threaded portions extending through the apertured lugs of the adjacent wear-plate, and nuts mounted on said threaded portions.

2. The combination of a support, a swinging tree, a pivot-bolt extending vertically through and connecting the support and the tree, opposed wear-plates interposed between the support and the tree and having central apertures receiving the pivot-bolt and apertured lugs extending beyond the support and the tree, respectively; one of said wear-plates also having a central portion journaled in the other wear-plate, a yoke straddling the support and having integral arms which terminate in threaded portions extending through the apertured lugs of the adjacent wear-plate, nuts mounted on said threaded portions, a yoke straddling the tree and having a raised flange on its upper side, around the pivot-bolt and also having integral arms which terminate in threaded portions extending through the apertured lugs of the adjacent wear-plate, nuts mounted on said threaded portions, a major yoke disposed at right angles to the tree and the support and having a recess in the under side of its top receiving the raised flange of the upper yoke and an aperture in said top receiving the pivot-bolt and also having diverging, apertured legs, and transverse bolts extending through and connecting said apertured legs and the support.

In testimony whereof I have hereunto set my hand in presence of two subscribing witnesses.

LOUIS BURG.

Witnesses:
O. G. CRAMBERG,
HERBERT L. JACKSON.